SPEED DICTATION APPARATUS FOR ELEVATOR MOTOR CONTROL SYSTEM
Original Filed Feb. 3, 1969 3 Sheets-Sheet 1
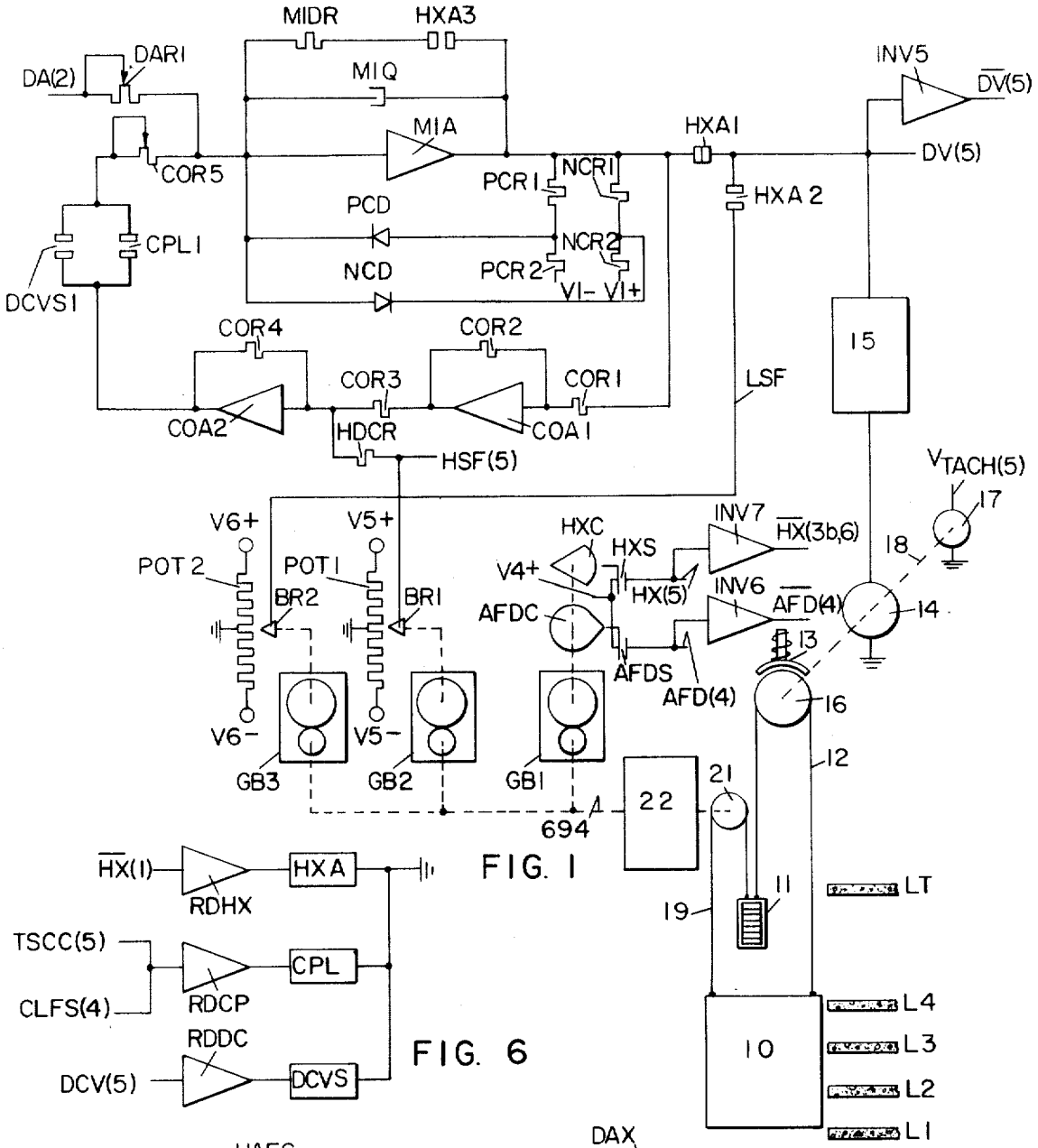
FIG. 1
FIG. 6
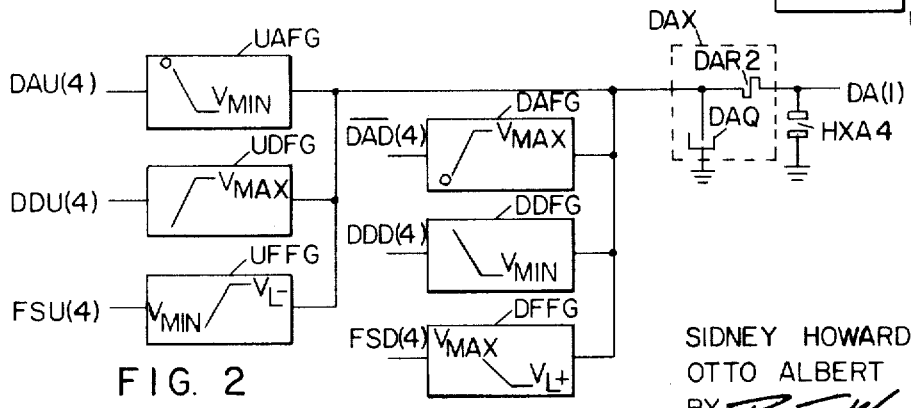
FIG. 2
INVENTORS
SIDNEY HOWARD BENJAMIN
OTTO ALBERT KRAUER
BY R. T. Mayer ATTORNEY SPEED DICTATION APPARATUS FOR ELEVATOR MOTOR CONTROL SYSTEM
Original Filed Feb. 3, 1969 3 Sheets-Sheet 2
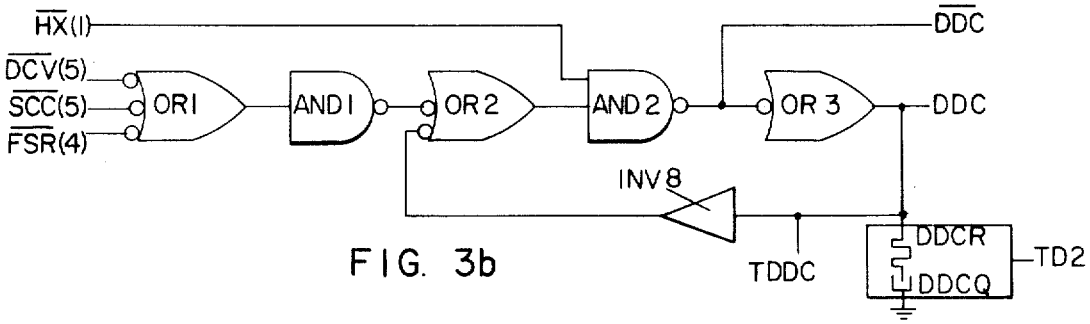
FIG. 3b
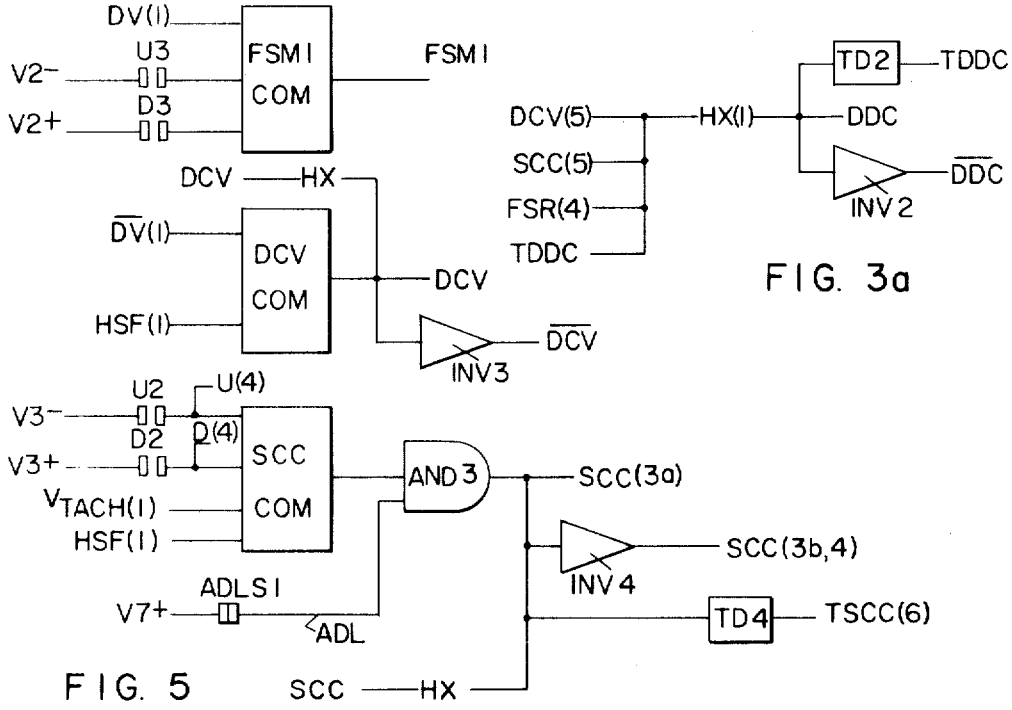
FIG. 3a
FIG. 5
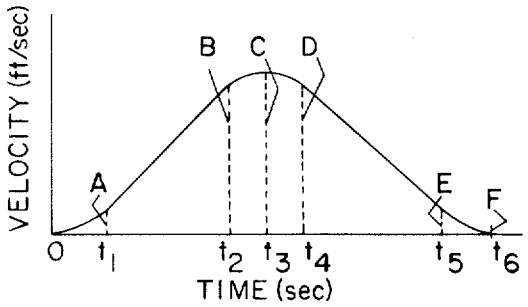
FIG. 9
INVENTORS
SIDNEY HOWARD BENJAMIN
OTTO ALBERT KRAUER
BY R. T. Mayer ATTORNEY SPEED DICTATION APPARATUS FOR ELEVATOR MOTOR CONTROL SYSTEM
Original Filed Feb. 3, 1969 3 Sheets-Sheet 3
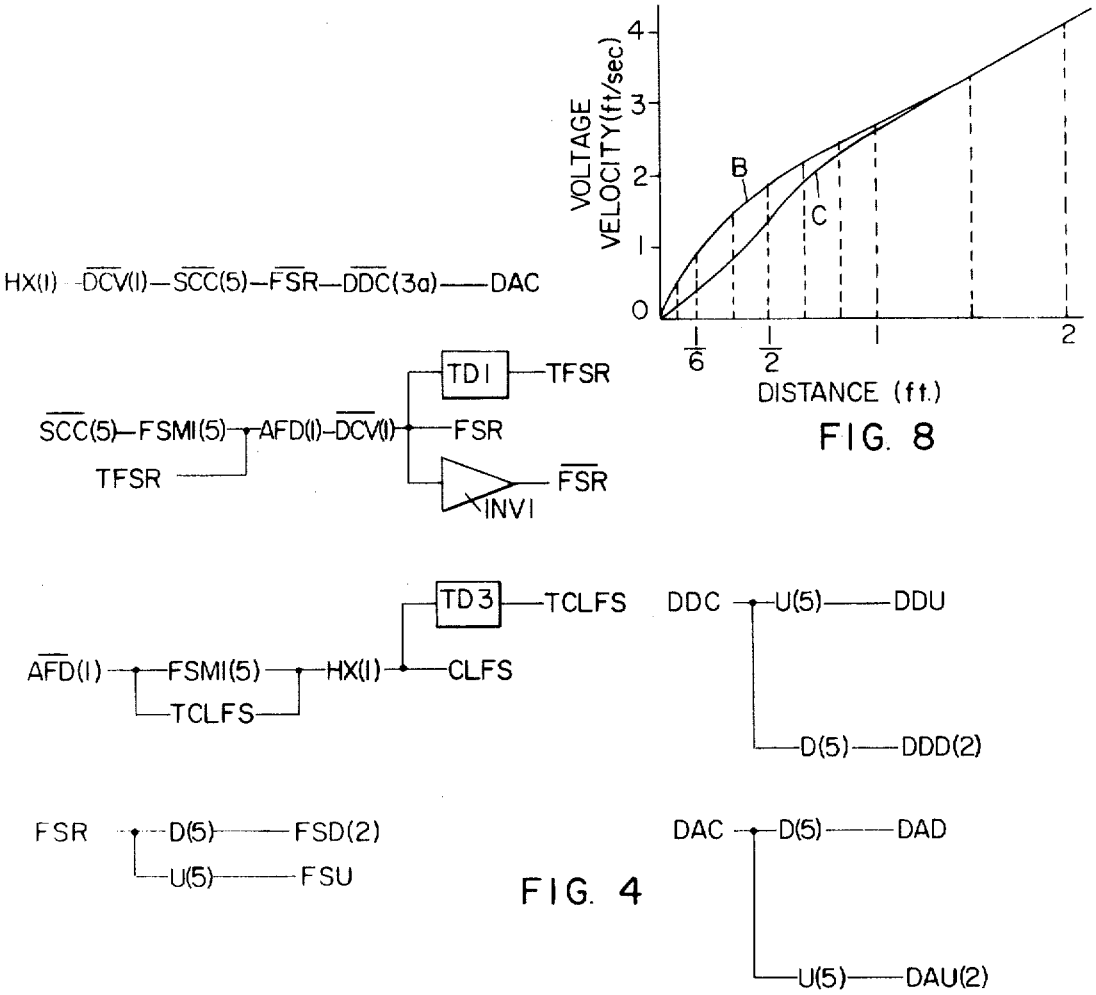
FIG. 4
FIG. 8
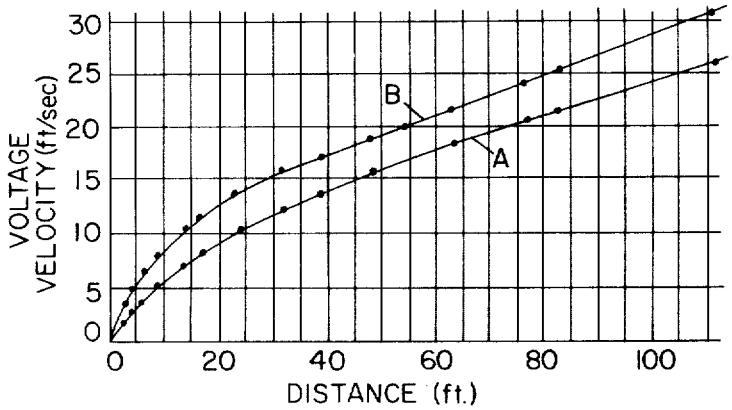
FIG. 7
INVENTORS
SIDNEY HOWARD BENJAMIN
OTTO ALBERT KRAUER
BY R. T. Mayer ATTORNEY United States Patent Office Re. 28,282
Reissued Dec. 24, 1974

28,282

SPEED DICTATION APPARATUS FOR ELEVATOR MOTOR CONTROL SYSTEM

Sidney Howard Benjamin, Brooklyn, and Otto Albert Krauer, Tuckahoe, N.Y., assignors to Otis Elevator Company, New York, N.Y.

Original No. 3,552,524, dated Jan. 5, 1971, Ser. No. 795,842, Feb. 3, 1969. Application for reissue Dec. 18, 1972, Ser. No. 316,325

Int. Cl. B66b *1/28*

U.S. Cl. 187—29 R 13 Claims

Matter enclosed in heavy brackets [ ] appears in the original patent but forms no part of this reissue specification; matter printed in italics indicates the additions made by reissue.

ABSTRACT OF THE DISCLOSURE

Speed dictation apparatus for a high speed elevator motor control system which generates a time controlled speed dictation signal to control the speed of the car in a predetermined manner so that it is accelerated at the same predetermined rate for any length of trip. A distance controlled speed dictation signal is also generated. This is operable to control the speed of the car during its deceleration in a predetermined manner as a function of its distance from a selected landing at which it is to stop. The car is decelerated in substantially the same predetermined manner as it would be by the distance controlled signal notwithstanding the continued generation of the time controlled signal which would otherwise cause the motor to control the speed of the car in a different manner.

This is an invention in the art of elevator control. More particularly it relates to apparatus for controlling the starting and stopping of elevator cars in high speed elevator systems.

By a high speed elevator system is herein meant one in which the minimum distance required to bring the car to a stop from its full rated running speed without discomforting passengers is greater than the floor height between two normally separated adjacent landings. This is not to be interpreted however as meaning that a car in such a system cannot provide service between adjacent landings by starting at one and stopping at the other. On the contrary, the car is nevertheless capable of making such one floor runs because the maximum speed it is permitted to attain on these runs is limited to an amount less than the full rated running speed. Thus, a high speed elevator system is capable of initiating a comfortable stopping operation at any car speed up to an including its full rated running speed.

In high speed elevator systems, the typical practice is to accelerate the cars as a function of time. On any trip, however, once it is decided to stop the car it is thereafter desirable to control the speed of the car as a function of its distance from the selected landing at which it is to stop. This is the only way to insure that the car will come to a stop with its floor within a desired degree of accuracy of the selected landing floor. Where this type of operation is provided, it is important that the transfer from control by time to control by distance take place in such a way as not to discomfort passengers. In most of these systems, however, it is difficult to provide this type of transfer without performing considerable labor at installation sites.

It is also desirable for good elevator service to provide the same rate of acceleration on short trips in which the car does not attain full rated speed as is provided on longer full speed trips. Where the same rate of acceleration is provided regardless of the length of the trip it eliminates any undesirable increase in the time required for short trips which otherwise would necessarily occur.

It is an object of this invention to provide speed control apparatus for controlling a high speed elevator which not only requires a minimum amount of labor during installation to accomplish a comfortable transfer from time control to distance control but also provides acceleration at the same predetermined rate regardless of the length of trip the car makes.

Another object of the invention is to provide apparatus by which an elevator car is accelerated at the same predetermined rate for any length of trip solely as a function of time in response to the operation of a time controlled speed dictation signal generating device and decelerated in a desired manner as a function of distance in accordance with the operation of a distance controlled speed dictation signal generating device.

One feature of the invention involves arranging an elevator installation so that its time controlled speed dictation signal generating means not only generates a time controlled signal which determines the acceleration of the car but also generates a time controlled signal which is operable to determine the deceleration of the car. The car is not decelerated in accordance with this latter control signal, however. Instead, the car is actually decelerated in the desired manner in accordance with a distance controlled signal generated by a distance controlled speed dictation signal generating means which is operable to decelerate the car as a function of its distance from a selected landing at which it is to stop. This is accomplished without disconnecting the time controlled speed dictation signal generating means and replacing it with the distance controlled one but rather by constraining the effect the time controlled deceleration signal has on the motor control system so that the system conforms the actual deceleration of the car to that which the distance controlled signal would otherwise produce.

In carrying out the invention a motor control system is arranged to control the speed of an elevator car by controlling the speed of the hoisting motor which drives the car. At the start of each trip in response to a signal to start the motor control system is connected to speed regulating equipment including a speed determining output voltage generator in the form of an integrating amplifier to receive speed determining output voltage therefrom. Simultaneously, a time controlled speed dictation signal generating means, including acceleration and deceleration signal function generators and a capacitive circuit, is connected to the input of the integrating amplifier. As a result of each signal to start, the acceleration signal function generator applies an input to the capacitive circuit so that in response the integrating amplifier on each individual trip generates a time controlled acceleration dictation voltage which regardless of the length of the trip operates to control the acceleration of the car at the same predetermined rate as a function of the time elapsed from the reception of the signal to start. After a signal to stop at a selected landing is received, the time controlled speed dictation signal generating means transfers its operating mode by switching the input to the capacitive circuit from its acceleration signal function generator to its deceleration signal function generator. The time controlled speed dictation signal generating means thereafter generates signals which are operable to cause the integrating amplifier to control the speed of the car during its deceleration in a predetermined manner as a function of the time elapsed from the transfer to the deceleration signal function generator. When the time controlled speed dictation signal generating means transfers its mode of operation the speed regulating equipment connects the output of the integrating amplifier through a summation amplifier in a feedback arrangement with the output of a distance controlled speed dictation signal generating means in the form of a landing selector mechanism. The landing selector mechanism generates an output signal which is operable to control the speed of the car in a predetermined manner during its deceleration as a function of the distance of the car from the selected landing. In this way, the difference between the output of the integrating amplifier and the output from the landing selector mechanism is applied to the input of the integrating amplifier to cause it to change its output and conform it to the signal generated by the landing selector mechanism. The magnitude of the feedback signal and the response time of the system determine the speed at which conformity occurs. In any event, the system is so designed that at some portion of the deceleration period and for the majority thereof the output signal from the integrating amplifier controls the deceleration of the car in accordance with the manner in which the landing selector mechanism signal would control it.

Other objects, features and advantages of the invention will be seen from the above and from the accompanying drawing when taken in consideration with the following description and the claims appended hereto.

In the drawings:

FIG. 1 is a simplified schematic of an elevator control system embodying the invention;

FIG. 2 is a schematic of a capacitive circuit and various signal function generators in block diagram form including acceleration and deceleration signal function generators for controlling both the upward and downward travel of an elevator car;

FIG. 3a is a logic diagram in straight line form of the switching logic functions employed to produce a signal to initiate the deceleration of the elevator car of the system of FIG. 1;

FIG. 3b is a schematic diagram of one implementation of circuits for generating the switching logic functions shown in FIG. 3a;

FIG. 4 is a number of logic diagrams in straight line form similar to that of FIG. 3a;

FIG. 5 is a schematic diagram of a plurality of comparator circuits;

FIG. 6 is a circuit diagram showing a number of relay circuits;

FIGS. 7 and 8 are graphs on which distance is represented by the abscissa and both velocity and voltage by the ordinate;

FIG. 9 is a graph on which time is represented by the abscissa and velocity by the ordinate.

To simplify the disclosure, only those portions of an elevator control system necessary for an understanding of the invention have been shown, it being understood that many changes may be made in adapting this invention to commercial installations. Although, as illustrated, the elevator car serves but five landings, it is also to be understood that the invention is suitable for use in any commercial high speed elevator installation having any number of landings.

Numerals in parentheses appended to some of the reference characters for interconnecting lines in the drawing identify those figures on which the continuation of these lines are located.

Referring to FIG. 1 of the drawing, an elevator car 10 and its counterweight 11 in typical fashion are supported by hoist ropes 12. The car moves whenever brake 13 is lifted and motor 14 receives power from motor control equipment 15 to rotate sheave 16. In rotating sheave 16, shaft 18 of motor 14 drives tachometer generator 17 to provide a voltage on line $V_{TACH}$ proportional to the speed of car 10. Motor control equipment 15 may be any suitable equipment, the equipment disclosed in the copending application of Otto Albert Krauer et al., Ser. No. 495,585 filed Oct. 13, 1965, now U.S. Pat. No. 3,442,352, and assigned to the assignee of the instant application being presently preferred.

Connected between car 10 and counterweight 11 is a tape 19 which is driven over a sprocket 21 as car 10 moves between any of the landings L1 to LT. Sprocket 21 drives the shaft of landing selector mechanism 22. The landing selector mechanism may be any one of several, such as that disclosed in the copending application of Otto Albert Krauer et al., Ser. No. 495,446, filed Oct. 13, 1965, now U.S. Pat. No. [3,442,352,] *3,433,326* for "Elevator Control System," and assigned to the assignee of the instant application; or that disclosed in the copending application of Herbert Frederick Voigt et al., Ser. No. 795,841, filed Feb. 3, [1968,] *1969* concurrently herewith now Pat. No. 3,570,630, for "Landing Selector Apparatus," and assigned to the assignee of the instant application; or that disclosed in U.S. Pat. No. 2,306,817, issued Dec. 29, 1942 to D. C. Larson.

For purposes of this disclosure assume the device disclosed in the forementioned Larson patent is employed for use with the system of the present invention. To this end, shaft 694 of the Larson device is connected to three gear boxes GB1, GB2, and GB3. Driven by gear box GB1 are cams AFDC and HXC for operating mechanical switches AFDS and HXS which, respectively produce signals AFD and HX directly and signals AFD and HX through inverters INV6 and INV7. Gear boxes GB2 and GB3 each respectively drives sliding contact, or wiper, BR1 of coarse potentiometer POT1 and sliding contact, or wiper, BR2 of fine potentiometer POT2. These potentiometers have their center points grounded and their end terminals connected across voltages V5—, V5+ and V6—, V6+, respectively.

Motor control equipment 15 for hoisting motor 14 is connected through contacts HXA2 of stopping switch HXA along line LSF to sliding contact BR2 of potentiometer POT2. In addition, the motor control eqipment is connected through contacts HXA1 to the output circuit of the speed regulating equipment. Included in the speed regulating equipment is a speed determining output voltage generator and voltage control equipment. The speed dictation output voltage generator includes operational amplifier MIA arranged as an integrating amplifier having input circuits through resistors DAR1 and COR5. Resistor DAR1 is connected along line DA to the equipment of FIG. 2. Resistor COR5 is connected through contacts DCVS1 and CPL1 of decelerating switches DCVS and CPL to the voltage control equipment. Condenser MIQ connected in parallel with resetting resistor MIDR through contacts HXA3 and positive and negative voltage clamping circuits are connected from the input to the output of amplifier MIA. The positive clamping circuit includes diode PCD and resistors PCR1 and PCR2 connected to voltage source V1—. The negative voltage clamping circuit includes diode NCD and resistors NCR1 and NCR2 connected to positive voltage source V1+.

The voltage control equipment of the speed regulating equipment includes inverting amplifier COA1, its input and output resistors COR1 and COR3 and its scaling resistor COR2. Input resistor COR1 is connected to the output circuit of integrating amplifier MIA. Output resistor COR3 is connected in one of the input circuits to summation amplifier COA2, whose output circuit is connected through contacts DCVS1 and CPL1 to resistor COR5. Connected in the second input circuit to summation amplifier COA2 through resistor HDCR and along line HSF is sliding contact BR1 of potentiometer POT1.

Represented in FIG. 2 is a time controlled speed dictation signal generating means including up and down direction signal function generators which are connected to line DA by way of capacitive circuit DAX comprising condenser DAQ and resetting resistor DAR2. Resetting contacts HXA4 connect line DA to ground.

FIG. 3a as mentioned, is a logic diagram in straight line form. This diagram may be interpreted to read that the function along line DDC is present, that is, the signal along line DDC changs to a binary 1 value, if the function along line HX is present and the function along either line DCV or line SCC or line FSR is present. Once the time delayed function along line TDDC produced by time delay circuit TD2 is present the signal along line DDC continues at the binary 1 value as long as the function along line HX is present. When the signal along line DDC changes to a binary 1 value, the signal along line $\overline{DDC}$ from inverter INV2 changes to a binary 0 value to signify its absence, and vice-versa.

The logic diagram shown in FIG. 3a may be implemented in any number of ways. For example, relay circuits may be employed in which contacts of the relays represent the presence or absence of the various functions. Preferably Nand circuits are used to perfom these switching logic functions. FIG. 3b illustrates the Nand circuits which perform the logic functions of FIG. 3a in And/Or logic. As conventionally symbolized by the small circles in each of their input circuit lines each Or circuit of FIG. 3b, OR1, OR2 and OR3 has each of its inputs inverted and, therefore, performs a Nand function. Each of the And circuits of FIG. 3b, AND1 and AND2 has its output inverted and therefore it also performs a Nand function.

Similarly, all the logic functions shown in FIG. 4 may preferably be implemented by Nand circuits in combination with the time delay circuits designated TD and the inverters designated INV. In an attempt to simplify the drawing, however, the Nand circuits for implementing these functions have not been shown.

Each of the comparator circuits shown in FIG. 5 produces an output when the algebraic sum of its input voltages equals zero. Comparators SCCCOM, and FSM1COM, contain contacts U2, D2, U3 and D3, in their input circuits. These U and D contacts respectively connect negative and positive voltage sources to their respective comparators depending upon whether or not the car is moving up or down. The output of comparator SCCCOM is connected as one input to And circuit AND3. An additional input is connected along line ADL.

A scale is shown on FIGS. 7 and 8 both for the distance abscissa and for the ordinate representing velocity to aid in understanding the specific operation which is hereinafter described. No voltage scale is shown for the voltage ordinates since such a scale is peculiarly a matter of choice and design in relation to the specific equipment used for particular elements of the control system.

In order to fully appreciate the invention it is helpful to understand the operation of this system under typical conditions of car travel. Assume car 10 is located at landing L1, that the up direction of travel is established and that a signal to start is received in any well known manner. In response to this signal landing selector mechanism 22 causes its advance floor scanner, or as it is more commonly known, its advance carriage mechanism (not shown), to start scanning. This rotates shaft 694 in a direction appropriate for the established direction of car travel. When the advance floor scanner signifies that it is scanning a position corresponding to a position in the hoistway approximately two feet in advance of the position of the car, cam HXC (FIG. 1) driven by shaft 694 through gear box GB1 disengages switch HXS which closes its contacts causing the signals along lines HX and $\overline{HX}$ to change to the binary 1 and binary 0 values, respectively. As a result the circuit for the logic function signal along line DAC (FIG. 4) is completed because of the presence of binary 1 signals along lines HX, $\overline{DCV}$, $\overline{SCC}$, $\overline{FSR}$, and $\overline{DDC}$. This causes the signal along line DAC to change to the binary 1 condition also. Simultaneously, the application of the binary 0 value along line HX, signifying the absence of function $\overline{HX}$, causes relay driver RDHX (FIG. 6) to remove energizing voltage from the coil of relay HXA causing it to release to open contacts HXA2, HXA3, and HXA4 and to close contact HXA1.

Since the up direction of travel is established, contacts U2 (FIG. 5) are closed and the logic function signal along line U is present in the binary 1 condition. This together with the signal along line DAC completes a circuit for the logic function signal along line DAU (FIG. 4), which thereupon changes to the binary 1 condition. This causes up direction acceleration signal function generator UAFG (FIG. 2) connected to line DAU to produce a negative output signal to charge condenser DAQ of capacitive circuit DAX and cause an output on line DA which takes the form shown in the block diagram representing generator UAFG. This signal decreases from 0 volts to the negative potential $V_{MIN}$ lineally in ½ second and is thereafter maintained at that potential until as hereinafter explained, later developments in the operation of the car cause it to change.

In charging, capacitive circuit DAX applies a signal along line DA through resistors DAR1 and DAR2 to the input of integrating amplifier MIA (FIG. 1) of the speed determining output voltage generator. As a result integrator MIA produces a desired velocity signal on line DV through contacts HXA1 which when applied to motor control equipment 15 causes the elevator car to start with a rate of change of acceleration of 8 feet per second$^3$ until it reaches a constant acceleration of 4 feet per second$^2$. This constant acceleration continues until either the generation of a signal to stop causes it to change or until the dictated car speed reaches a velocity equal to 1 foot per second less than its desired maximum velocity, or as it is better known, its full rated running speed.

Assume that a signal to stop is not generated and the dictated car speed reaches 1 foot per second less than the full rated running speed. Comparator FSM1COM (FIG. 5) responds to this condition by comparing a fixed value of voltage along line V2— equivalent to 1 foot per second less than full rated running speed with the output from integrating amplifier MIA along line DV. When these two compared signals are equal, comparator FSM1COM produces a binary 1 signal along line FSM1. By design, the advance floor scanner of the selector at this time has advanced a distance equivalent to more than the full speed stopping distance. As a result shaft 694 through gear box GB1 has driven cam AFDC into engagement with switch AFDS to close its contacts and produce a binary 1 signal along line AFD. The production of this signal in combination with the binary 1 signal along line FSM1 and the presence of binary 1 signals along lines $\overline{SCC}$ and $\overline{DCV}$ completes a circuit for the logic function signal along line FSR (FIG. 4) causing that signal to change to the binary 1 condition.

The binary 1 signal along line FSR is applied through time delay circuit TD1 to produce a binary 1 signal along line TFSR. This makes the binary 1 signal along line FSR self-holding as long as the signals along lines AFD and $\overline{DCV}$ maintain the binary 1 state. The time delay is required when the logic function circuit is implemented with Nand circuits to stabilize the self-holding circuit and prevent mis-operation.

The binary 1 signal along line FSR is also applied to inverter INV1 to cause the signal along line $\overline{FSR}$ to change to the binary 0 condition. As this occurs, the circuit for the production of a binary 1 signal along line DAC is interrupted changing the signal along that line to the binary 0 condition. Consequently, the signal along line DAU also changes to the binary 0 condition. The binary 1 signal along line FSR is also employed in conjunction with the binary 1 signal along line U to cause the production of a binary 1 signal along line FSU (FIG. 4). The binary 1 signals along line FSR and line HX cause the production of a binary 1 signal along line DDC (FIGS. 3a and 3b). This signal is applied to inverter INV2 to produce a binary 0 signal along line $\overline{DDC}$. The binary 1 signal along line DDC is also applied through time delay TD2 to produce a binary 1 signal along line TDDC. This causes the binary 1 signal along line DDC to be self-holding as long as the signal along line HX remains in the binary 1 state. The binary 1 signals along line DDC and ine U cause the production of a binary 1 signal along line DDU (FIG. 4).

The binary 0 condition of the signal along line DAU witches off up direction acceleration signal function generator UAFG (FIG. 2) while the binary 1 condition of he signals along lines FSU and DDU switches on up direction full speed signal function generator UFFG FIG. 2) and up direction deceleration signal function generator UDFG (FIG. 2). As illustrated in the block liagram representing generator UFFG this causes the voltage across condenser DAQ to increase from the potential of $V_{MIN}$ to that of $V_L-$. Under ideal conditions his increase would be to zero volts in ½ second to cause ntegrating amplifier MIA to produce a voltage which would bring the car to its full rated running speed at a lecreasing rate of acceleration of 8 feet per second³. However, owing to the leakage characteristics of condensers DAQ and MIQ, a continued application of the $V_L-$ potential is necessary at the input of integrater MIA n order to assure its output remaining at a voltage equivalent to the full running speed. When the input voltage to ntegrating amplifier MIA reaches the $V_L-$ potential, the output of the integrating amplifier reaches a voltage equivalent to full rated running speed where it is clamped by the positive voltage clamp.

At some time during the operation of the car at full running speed, the selector advance floor scanner selects a landing at which a stop is required and a signal to stop s generated. This causes the scanner to stop its scanning operation at a position corresponding to that landing. The continued movement of the car in approaching the selected landing causes shaft 694 to rotate the gears of gear boxes GB1, GB2 and GB3 in a direction opposite to that in which they had previously been turning. When the car reaches the full speed stopping distance from the selected landing, i.e. the point at which it has been calculated that it must start to slow down in order for it to stop at the landing in the prescribed manner, cam AFDC (FIG. 1) opens the contacts of switch AFDS. As a result the signal along line $\overline{AFD}$ changes to the binary 1 state while that along line AFD changes to the binary 0 state. The latter change interrupts the circuit for the generation of the binary 1 signal along line FSR. Consequently, the signal along this line also changes to the binary 0 state and interrupts the circuit for the generation of the binary 1 signal along line FSU. As a result, this signal changes to the binary 0 state and causes up direction full speed function generator UFFG (FIG. 2) to cease operating. Up direction decelerating function generator UDFG (FIG. 2) thereafter operates alone. This applies a signal across capacitive circuit DAX which causes the voltage on line DA to increase from the potential of $V_L-$ to that of $V_{MAX}$ at a rate which causes integrating amplifier MIA to decelerate the car at a rate of change of deceleration of 8 feet per second³ until a constant deceleration of 4 feet per second² is attained. Once the output voltage of circuit DAC reaches the potential of $V_{MAX}$ it is maintained thereat until generator UDFG ceases operating. This output voltage is operable to cause integrating amplifier MIA to produce a voltage which dictates that motor control equipment 15 continue to decelerate the car at a constant deceleration of 4 feet per second².

At some time during the deceleration of the car the dictated velocity voltage along line DV (FIG. 1) decreases to a potential equivalent to 1 foot per second less than the full rated running speed. At that time comparator FSM1COM (FIG. 5) again produces a binary 1 signal along line FSM1. This, in conjunction with the binary 1 signals along lines HX and $\overline{AFD}$ causes the production of a binary 1 signal along line CLFS (FIG. 4). This becomes self-holding through the binary 1 signal along line TCLFS and in that way is maintained after the binary 1 signal along line FSM1 disappears. The appearance of the binary 1 signal along line CLFS operates through relay driver RDCP to cause the operation of relay CPL (FIG. 6) which closes contacts CPL1 (FIG. 1) to place the feedback circuit of the signal control equipment around integrating amplifier MIA. Approximately simultaneously the dictated voltage comparator DCVCOM (FIG. 5) produces a binary 1 signal along line DCV as a result of the inverted velocity voltage along line $\overline{DV}$ from inverter INV5 becoming equal to the signal along line HSF from potentiometer POT1 (FIG. 1). The binary 1 signal along line DCV becomes self-holding through the binary 1 signal along line HX and operates through relay driver RDDC to cause relay DCVS (FIG. 6) to be energized and close its contact DCVS1 (FIG. 1). This acts as an alternate to complete the feedback circuit around amplifier MIA in case contacts CPL1 do not close.

It should be understood that after the selector mechanism advance floor scanner selects a landing, the movement of car 10 drives shaft 694 (FIG. 1) to rotate the gears of gear box GB2 such as to cause sliding contact BR1 of potentiometer POT1 to return to its center position. After scanning ceases, this position provides a coarse reference of the location of the selected landing. The returning movement of contact BR1 produces a decreasing output voltage along line HSF such as that shown by curve B of FIG. 7 with respect to the ordinate voltage scale. As will be explained later this voltage is operable to cause motor control equipment 15 to decrease the velocity of the car as a function of its distance from the selected landing at a constant deceleration of 4 feet per second² down to a velocity of 1 foot per second. After contacts DCVS1 or CPL1 close, this signal is compared with the inverted output of integrating amplifier MIA which is produced by inverting amplifier COA1 (FIG. 1). This comparison is such as to produce an algebraic summation which is generated as an output voltage from summation amplifier COA2. This voltage is applied to the input circuit of integrating amplifier MIA through resistor COR5 to cause the output voltage of amplifier MIA to conform to the output voltage along line HSF. The rate at which conformity takes place is determined by the size of the difference signal which is applied through resistor COR5. In the herein described tested embodiment conformity takes place most satisfactorily while the car is decelerating at 4 feet per second² so that thereafter the voltage along line DV which is applied to motor control equipment 15 is identical to that of curve B of FIG. 7.

At some time thereafter gear box GB1 causes its attached cam HXC (FIG. 1) to open the contacts of switch HSX to produce a binary 1 signal along line $\overline{HX}$. This operates through relay driver RDHX to energize relay HXA (FIG. 6) causing contacts HXA2 (FIG. 1) to engage and contacts HXA1 (FIG. 1) to disengage. As will be evidenced from previous discussion, at this point the car is approximately 2 feet from the location of the selected landing. Within a predetermined range either side of this distance the output voltage along line LSF from sliding contact BR2 (FIG. 1) of potentiometer POT2 is equal to the output voltage along line HSF from sliding contact BR1 of potentiometer POT1. When contacts HXA1 open and contacts HXA2 close, motor control equipment 15 no longer operates in response to the output voltage from integrating amplifier MIA but rather operates directly in response to the output voltage from sliding contact BR2 of potentiometer POT2. This voltage brings the car rapidly and accurately into the landing level. Ideally this would decelerate the car from a distance 2 feet from the selected landing at a constant deceleration of 4 feet per second² until a velocity of 1 foot per second was attained. Thereafter the car would decelerate at a rate of change of 8 feet per second³ until it reached zero velocity. In practice the final approach to the floor, as will be explained, is slightly different from the ideal and this is done so as not to introduce instability into the system.

As can be seen the final approach to the floor is not controlled by a time controlled output voltage which is forced into conformity with a prescribed distance controlled voltage but rather is controlled by a distance control voltage directly. This is done in the described tested embodiment because of the fear that drift in integrating amplifier MIA might cause the system to be inaccurate in the final approach to the landing level. However, it is contemplated that with a relatively drift free amplifier, a function generator could be provided to produce a time controlled signal which would be operable to bring the car to a stop in the ideal manner as a fuction of time. This could be applied to integrating amplifier MIA and its output voltage could be forced into conformity with the output voltage along line LSF from sliding contact BR2 of potentiometer POT2. If the car were to be decelerated in this manner the transfer from control by a time controlled signal which is forced into conformity with a distance controlled signal to control by a distance controlled signal directly would be eliminated.

A trip at full rated running speed has just been described. An example of a trip at less than full speed will aid in completely understanding this invention. Assume that a signal to start has been received and that the car is again accelerating in the up direction at a rate of 4 feet per second$^2$ in the manner previously described. Further assume that while the car is so accelerating, the selector mechanism advance floor scanner selects a landing at which a stop is required and a signal to stop is generated which causes the scanner to stop its scanning operation at a position corresponding to the landing, and that this landing is not far enough away from the landing from which the car started to permit it to reach full rated running speed. In these circumstances the stopping operation of the car is initiated by a signal to stop accelerating which is received while the car is accelerating at a constant acceleration of 4 feet per second$^2$.

Passenger comfort can be assured by initiating the stopping operation when the velocity of the car and its distance from the selected landing are such that the acceleration of the car can be decreased at a rate of change of 8 feet per second$^3$ for one-half second until the acceleration ceases, whereupon the car can be slowed down at a rate of change of deceleration of 8 feet per second$^3$. When a deceleration of 4 feet per second$^2$ is attained the car can be brought to a stop in accordance with the hereinbefore described operation.

At the time a signal to stop accelerating initiates this desired stopping operation during a car's constant acceleration period, a relationship exists between the instantaneous velocity of the car and its distance from the selected landing at which it is to stop. This relationship is readily determinable from straight-forward mathematics and is graphically illustrated in FIG. 7 with respect to the ordinate velocity scale by the curve marked A. From this, it should be understood that during constant acceleration a signal to stop accelerating is to be generated whenever the instantaneous velocity of the car and the distance remaining to the selected landing level at that instant both satisfy coordinates on this curve. It is now appropriate to examine how and by what means it is determined when to generate this signal to stop accelerating.

From the prior description of the operation at full rated running speed, it will be recalled that with respect to the ordinate voltage scale, curve B of FIG. 7 represents the manner in which the potential of the output voltage along line HSF from sliding contact BR1 of potentiometer POT1 decreases after a landing is selected. As explained, this voltage is operable to decelerate the car at a constant rate as a function of its distance from a selected landing until the car is within approximately two feet of that landing. From this, it should be understood that whenever a car is more than two feet from a selected landing, this output voltage represents the desired velocity of the car as a function of its distance from the selected landing while it is decelerating to a stop at that landing in the manner desired. At distances greater than two feet, curve B, represents this velocity with respect to the ordinate velocity scale of FIG. 7.

It is to be remembered, that, under the assumed conditions the elevator car is undergoing constant acceleration when the landing is selected. Since the output voltage from sliding contact BR1 represents the desired velocity while the car is decelerating, the car must first go through a transition from acceleration to deceleration before this output voltage can be employed. The time required to accomplish this transition is anticipated and provided for because, as mentioned, the signal to stop accelerating is generated when the actual car velocity and its distance from the selected landing satisfy coordinates of curve A on FIG. 7. The coordinates of this curve represent the maximum velocity a car undergoing constant acceleration can attain at any particular distance from a selected landing before its acceleration must start to decrease. At any distance from a selected landing a relationship exists between the maximum constant acceleration velocity for that distance as represented by the coordinates of curve A and the desired constant deceleration velocity for that distance as represented by the coordinates of curve B. Stated otherwise, at any point along the abscissa on the graph of FIG. 7 a relationship exists between the velocity on curve A for that point and the velocity on curve B for that point. This relationship is defined by the equation:

$$V_B^2 = V_A^2 + 8V_A + \frac{16}{3} \qquad (1)$$

where $V_B$=the desired constant deceleration velocity represented by the output voltage from contact BR1 after the selection of a landing, and $V_A$=the maximum constant acceleration velocity represented by the output voltage from tachometer generator 17.

In other words, after a landing has been selected, the signal to stop accelerating is to be generated whenever the actual velocity of the car and the velocity represented by the output voltage from sliding contact BR1 bear the relationship to each other defined by the above equation. In the present embodiment, however, for car speeds of interest, i.e. from 3.75 feet per second to about 27 feet per second, it has been found satisfactory to generate the signal to stop accelerating when these velocities bear a less complex relationship to each other. This relationship is defined by the equation:

$$V_B = 1.04V_A + 3.2 \text{ feet per second} \qquad (2)$$

or $$V_B - 1.04V_A - 3.2 \text{ feet per second} = 0 \qquad (3)$$

Comparator SCCCOM (FIG. 5) computes the existence of this latter equality and generates a signal to stop accelerating as a result thereof. In order to understand the operation of this comparator, the description of the trip at less than full rated running speed will continue. It will be recalled that the car is traveling in the up direction. Thus, contacts U2 are closed. This applies a negative potential V3— equivalent to 3.2 feet per second along line U4 to comparator SCCCOM. The selector advance floor scanner has stopped its scanning and has selected a landing at which it is desired to stop. This, as is later explained, operated to close contacts ADLS1 (FIG. 5) and to apply a binary 1 signal along line ADL to AND circuit AND3.

All the time the car is accelerating an output voltage is transmitted from sliding contact BR1 (FIG. 1) along line HSF and from tachometer generator 17 (FIG. 1) along line $V_{TACH}$ to comparator SCCCOM (FIG. 5). Assume that with the up direction of travel established the output voltage along line HSF is positive in polarity and that along line $V_{TACH}$ is negative. The polarization of these signals enables comparator SCCCOM to determine when the proper conditions for generating the signal to stop accelerating are satisfied.

As the acceleration of the car continues, the magnitude of the output voltage along line $V_{TACH}$ from tachometer generator 17 increases. During the same period the car is getting nearer the floor selected by the advance floor scanner and as a result the magnitude of the output voltage along line HSF from sliding contact BR1 is decreasing. By proper scaling when the car reaches that distance from the floor at which the signal to stop accelerating should be generated, the sum of the input voltages to comparator SCCCOM is zero causing it to produce a binary 1 signal at the second input to AND circuit AND3. With this, a binary 1 signal is applied to both inputs of this circuit and it produces a binary 1 signal along line SCCC and a binary 0 signal along line SCC. The latter interrupts the circuit for the logic function signal along line DAC (FIG. 4) causing it to change to the binary 0 condition. This, in turn, interrupts the circuit for the logic function signal along line DAU (FIG. 4) causing it also to change to the binary 0 condition. As a result, up direction accelerating signal function generator UAFG (FIG. 1) is switched off.

Simultaneously, the production of the binary 1 signal along line SCC becomes self-holding through the binary 1 signal along line HX and in conjunction therewith completes a circuit for the logic function signal along line DDC (FIG. 4) causing that signal to change to the binary 1 condition. In combination with the binary 1 signal along line U the binary 1 signal along line DCC completes the circuit for the logic function signal along line DDU (FIG. 4) and changes that signal to a binary 1. This energizes up direction decelerating signal function generator UDFG (FIG. 2) which applies its output signal across capacitive circuit DAX (FIG. 2). In response the voltage on line DA increases to the potential of $V_{MAX}$ from the negative potential it had reached as a result of the reception by circuit DAX of the signal from generator UAFG. The rate of this increase is such as to cause the output voltage from integrating amplier MIA to decrease the car's acceleration at a rate of 8 feet per second$^3$ until the acceleration is zero and then to decelerate the car at a rate of change of 8 feet per second$^3$ until a deceleration of 4 feet per second$^2$ is attained. It takes one second to accomplish this. At the end of that second time delay device TD4 (FIG. 5) generates a binary 1 signal along line TSCC. This energizes the coil of relay CPL (FIG. 6) which operates to close contacts CPL1 (FIG. 1) and connect the feedback circuit of the voltage control equipment around integrating amplier MIA. As in the operation at full rated running relay DVCS (FIG. 6) is energized approximately simultaneously to provide an alternate connection for the feedback circuit through contacts DVCS1. Thereafter the remainder of the decelerating operation takes place in the manner described for the operation at full rated running speed.

In the course of this description it has previously been mentioned that selector mechanism 22 generates four separate signals. One of these signals commences when the advance floor scanner selects a landing and stops its scanning operation. The source of this signal has previously been designated by contacts ADLS1 (FIG. 5). A second signal exists whenever the advance floor scanner signifies its location in a position corresponding to a position two feet or more in advance of the position of the car in the hoistway. Contacts HXS (FIG. 1) have previously been designated as the source of this signal. A third signal exists whenever the car is full speed stopping distance or more from a floor at which it is to stop. The source of this signal has previously been designated by contacts AFDS (FIG. 1). The fourth signal is a continuous indication of the distance the advance floor scanner signifies it is from the indicated position of the car.

There are known mechanisms which generate these signals. One which has already been identified as being capable of being used with the present invention is the mechanism described in U.S. Pat. No. 2,306,817, issued Dec. 29, 1942, to D. C. Larson. In employing this mechanism, the first above mentioned signal may be generated by breaking contacts (i.e. contacts which disengage and engage when the coil of the switch which operates them is energized and deenergized, respectively) of the first auxiliary stopping relay A; the second signal, by switch 102 if it is set to close its contacts and keep them closed whenever the advance floor scanner is at a location corresponding to a position in the hoistway two or more feet in advance of that of the car; the third signal, by switch 121 if it is set to close its contacts and keep them closed whenever the car is full speed stopping distance or more from a landing at which it is to stop; and the fourth signal, by the angular position of shaft 694.

It is appropriate, at this time, to consider how selector 22 transduces the angular position of shaft 694 into a signal suitable to perform the functions previously attributed to it. As will be recalled, at distances greater than two feet, this signal corresponds to curve B of FIG. 7 and 8. From FIG. 1 it can be seen that shaft 694 drives sliding contacts BR1 and BR2 of potentiometers POT1 and POT2 through suitable gearing. The voltages at sliding contacts BR1 and BR2 are each a function of the distance between the advance floor scanner and the indicated position of the car. From previous explanations it will be appreciated that after landing selection, it is desired that these voltages, although functions of distance, each have a form which will dictate the described operation as if each were a function or time. The following described how this is achieved.

The curve of FIG. 9 represents the velocity characteristics for a typical run of an elevator car operated in the hereinbefore mentioned ideal manner. Consider this curve in the region from its origin to point A. In this region, according to the described operation, the jerk, j, is constant and equal to 8 feet per second$^3$. Assuming that the car starts from a first landing at t=0 and that distance is measured from this landing, the following relationships can be derived by straightforward mathematics:

$$\text{Jerk} = j = 8 \text{ ft./sec.}^3 \quad (4)$$

$$\text{Acceleration} = a = 8t \quad (5)$$

$$\text{Velocity} = v = 4t^2 \quad (6)$$

$$\text{Distance} = s = \frac{4}{3}t^3 \quad (7)$$

$$\text{Velocity} = v = (6s)^{2/3} \quad (8)$$

This portion of the curve extends until time $t_1$, at which time $$a = 4 \text{ ft./sec.}^2$$

$$t_1 = \frac{1}{2} \text{ second}$$

$$v = 1 \text{ ft./second}$$

$$s = \frac{1}{6} \text{ foot}$$

Now, consider the portion of the curve from point A to point B, where a=4 ft./sec.$^2$. Starting with the initial conditions that at s=⅙ foot, v=1 ft./sec. it can be shown by straightforward mathematics, that for this portion of the curve $$v = \frac{1}{3}\sqrt{72s - 3} \quad (9)$$

$$v^2 = 8s - \frac{1}{3} \quad (10)$$

$$s = \frac{v^2}{8} + \frac{1}{24} \quad (11)$$

Because the ideal velocity-time curve of FIG. 9 is symmetrical, the above expressions, although derived for the portion of the curve between its origin and point B, are equally applicable to the portion of the curve from $t_4$ to $t_6$ if we regard the distance s as zero at $t_6$ and increasing to the left toward $t_4$.

Curve B of FIGS. 7 and 8 is a graph of equations (8) and (9) showing the ideal velocity during deceleration as a function of distance from a selected floor. The portion above s=⅙ foot is a plot of equation (9). In order to generate a signal indicative of this velocity either the potentiometer POT1 (FIG. 1) is made non-linear on each side of its center tap in accordance with equation (9) or a linear potentiometer may be employed whose output voltage is applied to a function generator constructed to generate the signal. If a non-linear potentiometer is employed it may be made by well known techniques, starting with a linear potentiometer with many taps and adding suitable shunts. Voltages of opposite polarities V5+, V5— are applied to the extremities and the center tap is grounded. The potentiometer is a multiturn rotary one whose wiper makes no more than one transit from the center tap of its resistance element to either of its extremities while the advance floor scanner travels a distance equivalent to full speed stopping distance ahead of the car in either direction. Therefore, the output voltage from sliding contact BR1 indicates, by its polarity, whether the car is above or below a selected landing, and represents, by its magnitude, the velocity at which the car should be traveling during its constant deceleration period at any distance from a selected landing, if it is to stop in the described manner. Of course, the magnitude of voltages V5+, V5— are sufficient to extend the magnitude of the output voltage from contact BR1 to and beyond that indicative of the full speed stopping distance. It should be also understood that potentiometer POT1 is suitable to provide the described operation only at distances greater than ⅙ foot from the landing and, furthermore, as has been explained, that operation is desirable only at distances greater than about two feet.

The portion of curve B of FIG. 8 below ⅙ foot has a slope which becomes infinite as the distance from the floor approaches zero. If a signal were to be generated in accordance with this curve, it would dictate a very large change in velocity for a very small change in distance. Motor control systems which could follow such a signal in the region near zero would be required to have substantially infinite gain. This, of course, is not feasible. Additionally, as the gain of these systems is increased, problems of stability increase. These considerations impose a practical upper limit on the slope of the velocity versus distance curve in the region closer than ⅙ foot from a selected landing.

It must be remembered that the elevator car is not only to stop accurately at a landing but is also to stay level with a landing should expansion and contraction of the hoist ropes caused by passenger transfers tend to change the position of the car with respect thereto. Such operations require that a signal of reasonable magnitude be generated when the car is within a region of a few inches on either side of a landing level. For this reason, a practical lower limit is imposed on the slope of the velocity versus distance curve in this region.

For the above reasons, curve B is replaced, in the region near zero distance, with curve C of FIG. 8. This curve is derived by first determining reasonable minimum and maximum slopes based on the foregoing considerations of gain, stability and accuracy. Next the first portion of curve C is drawn, keeping its slope less than the maximum, and greater than the minimum, in the region below ⅙ foot, to provide a signal adequate for accuracy purposes in this region. The remainder of curve C is extended from the first portion, either continuously or in steps, so as to join smoothly with curve B being careful not to exceed the maximum slope. It has been found feasible to make a smooth transition at a distance of approximately two feet by making the ordinates of curve C substantially equal to those of curve B in the region from one and one-half to two and one-half feet.

Potentiometer POT2 (FIG. 1) is constructed to have a non-linear resistance versus rotation characteristic on each side of its center tap in accordance with curve C of FIG. 8, regarding the abscissa as degree of rotation and the ordinate as resistance. A one turn rotary potentiometer whose wiper can turn continuously through zero in either direction and which makes one full revolution for each six feet of car travel has been found to be satisfactory for potentiometer POT2. It also may be constructed by connecting suitable shunts across a plurality of taps. As in the case of potentiometer POT1, voltages of opposite polarities V6+, V6— are connected to opposite extremities and the center tap is grounded. Potentiometer POT2 may be connected in place of potentiometer POT1 when the elevator car is anywhere in the region between one and one-half and two and one-half feet from the landing. Preferably switching is effected by switch HXS which is operated in this region by shaft 694 through gear box GB1.

One effect of using curve C instead of curve B is that the time required to bring the car to the landing is increased. However, the increase is small because the variation from the ideal operation to the described desired one is slight and occurs only in the region below two feet.

If the forementioned Larson selector mechanism is employed the accuracy with which the distance controlled voltages can position the car at any landing level depends upon the accuracy with which the advance floor scanner or advancer carriage mechanism 703 is located at a position corresponding to that landing. A high degree of stopping accuracy, i.e. stopping the car within at least ±¼ inch of any landing, is obtainable first, by establishing the contacting surfaces between each lug 706 and pawls 704 and 705 so that each pawl stops the advancer carriage mechanism with the same accuracy at each position corresponding to a landing and second, by utilizing two separate coarse potentiometers and two separate fine potentiometers, one each for each direction of travel instead of one coarse and one fine each for both directions of travel as previously described.

Where two separate coarse and fine potentiometers are employed, one of each is employed on each down trip and uses the reference established when pawl 704 contacts any lug 706 and the other of each is employed on each up trip and uses the reference established when pawl 705 contacts any lug 706.

Although the method of operation described is specific to particular magnitudes of acceleration, deceleration and jerk it should be appreciated that the invention is not limited to these magnitudes. Various other modifications are also possible, and it is intended that the embodiments specifically described not be considered to be exclusive or in any sense limiting.

What is claimed is:

1. In a system for controlling the speed of travel of a high speed elevator car in which the car starts on any trip by accelerating in response to a signal to start and completes each trip by decelerating to a stop at a selected one of a plurality of landings in response to a signal to stop thereat, apparatus comprising, time controlled speed dictation signal generating means operating in response to the reception of each signal to start and on each individual trip generating a time controlled speed dictation signal which is operable to control the speed of the car in a predetermined manner so that said car is accelerated at the same predetermined rate regardless of the length of the trip;

a landing selector mechanism operating during each individual trip of said car in response to the reception of the signal to start on that trip and the signal to stop the trip at a selected landing and generating a distance controlled speed dictation signal operable to control the speed of said car in a predetermined manner during its deceleration as a function of the distance of said car from said selected landing;

speed regulating equipment connected to said time controlled speed dictation signal generating means and to said landing selector mechanism and during each trip generating an output signal in response to said time controlled and said distance controlled speed dictation signals;

a hoisting motor driving said elevator car; and motor control equipment connected to said speed regulating equipment to receive its output signal and in accordance therewith control the speed of rotation of said hoisting motor and thereby control the speed of said car;

said speed regulating equipment operating in response to the reception of a signal to stop at a selected landing and generating an output signal which controls the speed of the car during deceleration in substantially the same predetermined manner as said distance controlled speed dictation signal would notwithstanding the continued reception of the time controlled speed dictation signal from said time controlled signal generating means which would otherwise cause said speed regulating equipment to control the speed of said car in a different manner.

2. In a system according to claim 1, wherein said time controlled speed dictation signal generating means includes an acceleration signal function generator operating in response to the reception of each signal to start and on each individual trip generating a time controlled acceleration dictation signal which regardless of the length of said trip is operable to accelerate said car at the same predetermined rate as a function of time and a deceleration signal function generator operating in response to the reception of a signal to stop at a selected landing during each individual trip of the car and generating a time controlled speed dictation signal operable to control the speed of said car during its deceleration in a predetermined manner as a function of time.

3. In a system according to claim 2, wherein said speed regulating equipment includes both an output voltage generator and output voltage control equipment;

said output voltage control equipment being connected to said landing selector mechanism to receive its distance controlled speed dictation signal and in response to the reception of a signal to stop at a selected landing generating a voltage proportional to the difference between said distance controlled speed dictation signal and the output signal of said speed regulating equipment; and said output voltage generator during the deceleration of said car receiving the time controlled deceleration dictation signal from said deceleration signal function generator and the proportional difference voltage from said output voltage control equipment and generating in accordance therewith as the output signal of said speed regulating equipment an output voltage whereby the difference between the output signal of said speed regulating equipment and said distance controlled speed dictation signal is continuously reduced until the former conforms to the latter.

4. In a system according to claim 3, wherein said acceleration signal function generator is connected to said output voltage generator in response to the reception of a signal to start and disconnected therefrom in response to the reception of a signal to stop whereupon said deceleration signal function generator is connected to said output voltage generator.

5. In a system according to claim 4, wherein said time controlled signal generating means includes a capacitive circuit and during each trip of said car said acceleration and deceleration signal function generators generate voltages of opposite polarities which produce predetermined voltage charges across said capacitive circuit.

6. In a system according to claim 5, wherein said output voltage generator includes an integrating amplifier having an input circuit and an output circuit, said input circuit being connected to said capacitive circuit to receive *the voltage across said capacitive circuit, said output circuit* being connected to said motor control equipment, said integrating amplifier integrating the voltage received by said input circuit and producing an output speed determining voltage at its output circuit from which it is received by said motor control equipment, said output voltage generator including voltage output clamping circuits for clamping the output speed determining voltage of said integrating amplifier at predetermined minimum and maximum magnitudes.

7. In a system according to claim 6, wherein the distance controlled speed dictation signal generated by said landing selector mechanism is a voltage suitable for direct application to said motor control equipment.

8. In a system according to claim 7, wherein said output voltage control equipment includes an inverting amplifier, a summation amplifier and decelerating switching means, said inverting amplifier receiving and inverting the output speed determining voltage of said integrating amplifier, said summation amplifier algebraically summing the magnitudes of said landing selector mechanism voltage and the voltage produced by said inverting amplifier, and said decelerating switching means connecting said summation amplifier to the input circuit of said integrating amplifier during each trip of said car in response to the reception of a signal to stop at a selected landing whereby the input voltage thereafter applied to said integrating amplifier comprises the algebraic sum of the voltage across said capacitive circuit resulting from the voltage generated by said deceleration signal function generator and the difference between said landing selector mechanism voltage and the output speed determining voltage produced by said integrating amplifier.

9. In a system according to claim 8, wherein said output voltage control equipment includes stopping switching means responsive during each trip of said car to the approach of the car within a predetermined distance of the selected landing at which a stop is to be made disconnecting said motor control equipment from the output circuit of said integrating amplifier and connecting it to receive the voltage generated by said landing selector mechanism.

*10. In a system for controlling the speed of travel of an elevator car in which the car starts on any trip by accelerating in response to a signal to start and completes each trip by decelerating to a stop at a selected one of a plurality of landings in response to a signal to stop thereat, apparatus comprising;*

*first and second speed dictation signal generating means generating, respectively, a first and a second speed dictation signal, each operable to control the speed of the car;*

*a hoisting motor driving said elevator car;*

*speed regulating equipment connected to said first and second speed dictation signal generating means and generating an output signal in response to said first and second speed dictation signals; and*

*motor control equipment connected to said speed regulating equipment to receive its output signal and thereby control the speed of rotation of said hoisting motor and the speed of said car in accordance with said first and second speed dictation signals;*

*said speed regulating equipment simultaneously receiving both the first and the second speed dictation signals during a given time period and transferring control of said motor over said time period at a predetermined gradual rate from an operation in which said first signal predominates and said second signal is subordinate in controlling said motor to an operation in which said second signal predominates and said first signal is subordinate.*

*11. In a system according to claim 10, wherein said first speed dictation signal generating means generates a voltage which varies with time in a predetermined manner and said second speed dictation signal generating means*

*generates a voltage which varies in a predetermined manner with the distance of said car from a selected landing at which it is to stop and wherein said speed regulating equipment transfers control at said predetermined gradual rate in response to a signal to stop at said selected landing.*

*12. In a system according to claim 11, wherein said speed regulating equipment includes an output voltage generator and output voltage control equipment, said speed regulating equipment receiving said time controlled voltage before the production of said signal to stop and said output voltage generator generating a voltage in accordance therewith, said output voltage control equipment in response to said signal to stop receiving the voltage produced by said output voltage generator and said distance controlled voltage and producing a voltage proportional to the difference between the two, said output voltage generator in response to said signal to stop receiving said time controlled voltage and said proportional difference voltage whereby the difference between its output voltage and said distance controlled voltage is gradually reduced over said given time period.*

*13. In a system according to claim 12, wherein said output voltage generator includes an integrating amplifier producing said output voltage and said output voltage control equipment includes an inverting amplifier, a summation amplifier and decelerating switching means, said inverting amplifier receiving the output voltage of said integrating amplifier and applying it to said summation amplifier, said summation amplifier also receiving the distance controlled output voltage of said second speed dictation signal generating means and producing the algebraic sum of the magnitudes of said distance controlled voltage and the voltage produced by said inverting amplifier, said decelerating switching means connecting said summation amplifier to the input circuit of said integrating amplifier in response to a signal to stop at a selected landing whereby the input voltage thereafter applied to said integrating amplifier comprises the algebraic sum of the time controlled voltage produced by said first speed dictation signal generating means and the difference between said distance controlled voltage and the output voltage produced by said integrating amplifier.*

References Cited

The following references cited by the Examiner, are of record in the patented file of this patent or the original patent.

UNITED STATES PATENTS

| | | | |
|---|---|---|---|
| 3,350,612 | 10/1967 | Hansen et al. | 187—29 X |
| 3,435,916 | 4/1969 | Bell et al. | 187—29 |

BERNARD A. GILHEANY, Primary Examiner

W. E. DUNCANSON, Jr., Assistant Examiner